F. M. SHARP & L. W. WILLIAMS.
MACHINE FOR REMOVING CORES FROM CASTINGS.
APPLICATION FILED NOV. 21, 1908.
930,892.
Patented Aug. 10, 1909.
5 SHEETS—SHEET 1.
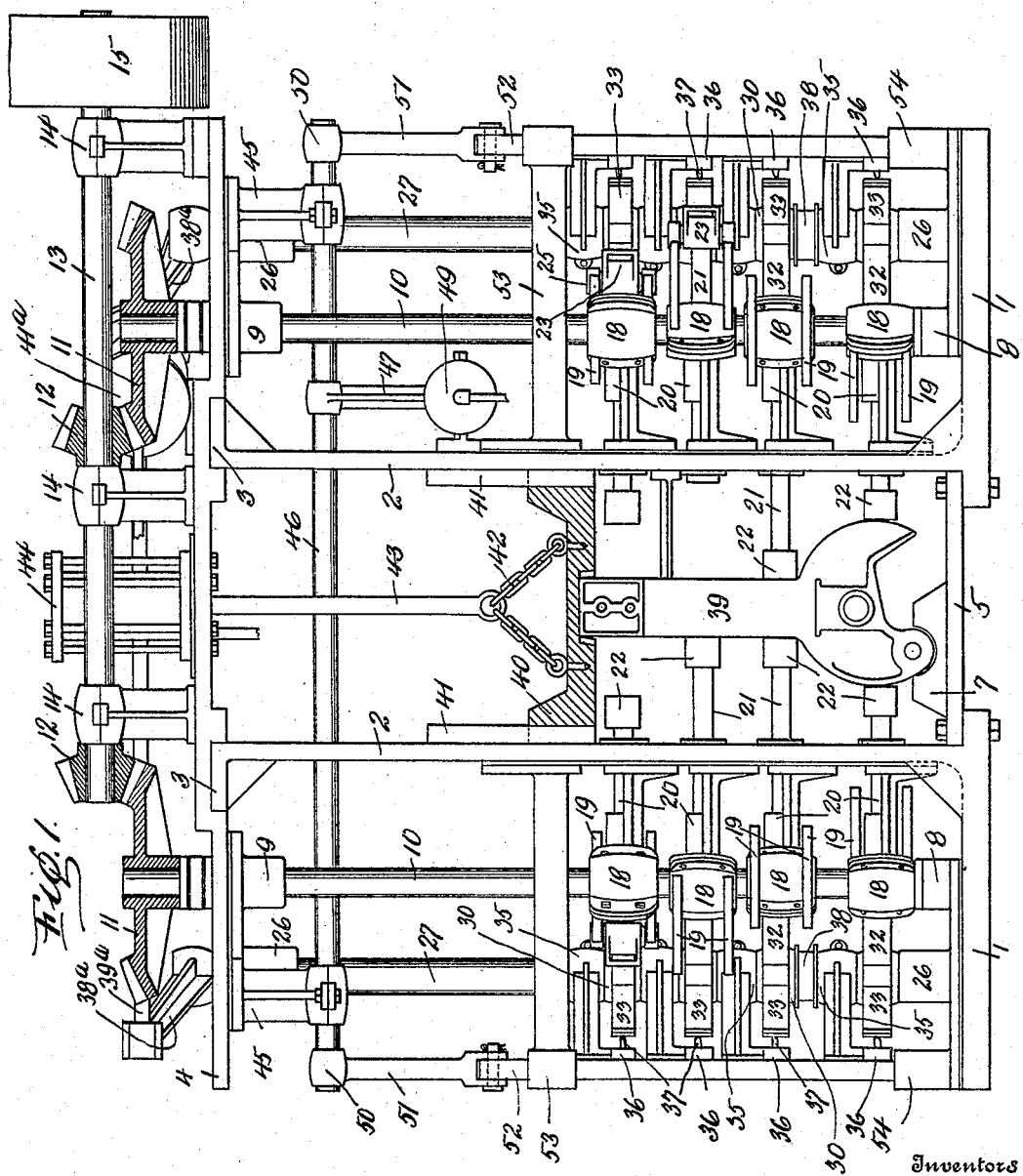

F. M. SHARP & L. W. WILLIAMS.
MACHINE FOR REMOVING CORES FROM CASTINGS.
APPLICATION FILED NOV. 21, 1908.
930,892.
Patented Aug. 10, 1909.
5 SHEETS—SHEET 2.
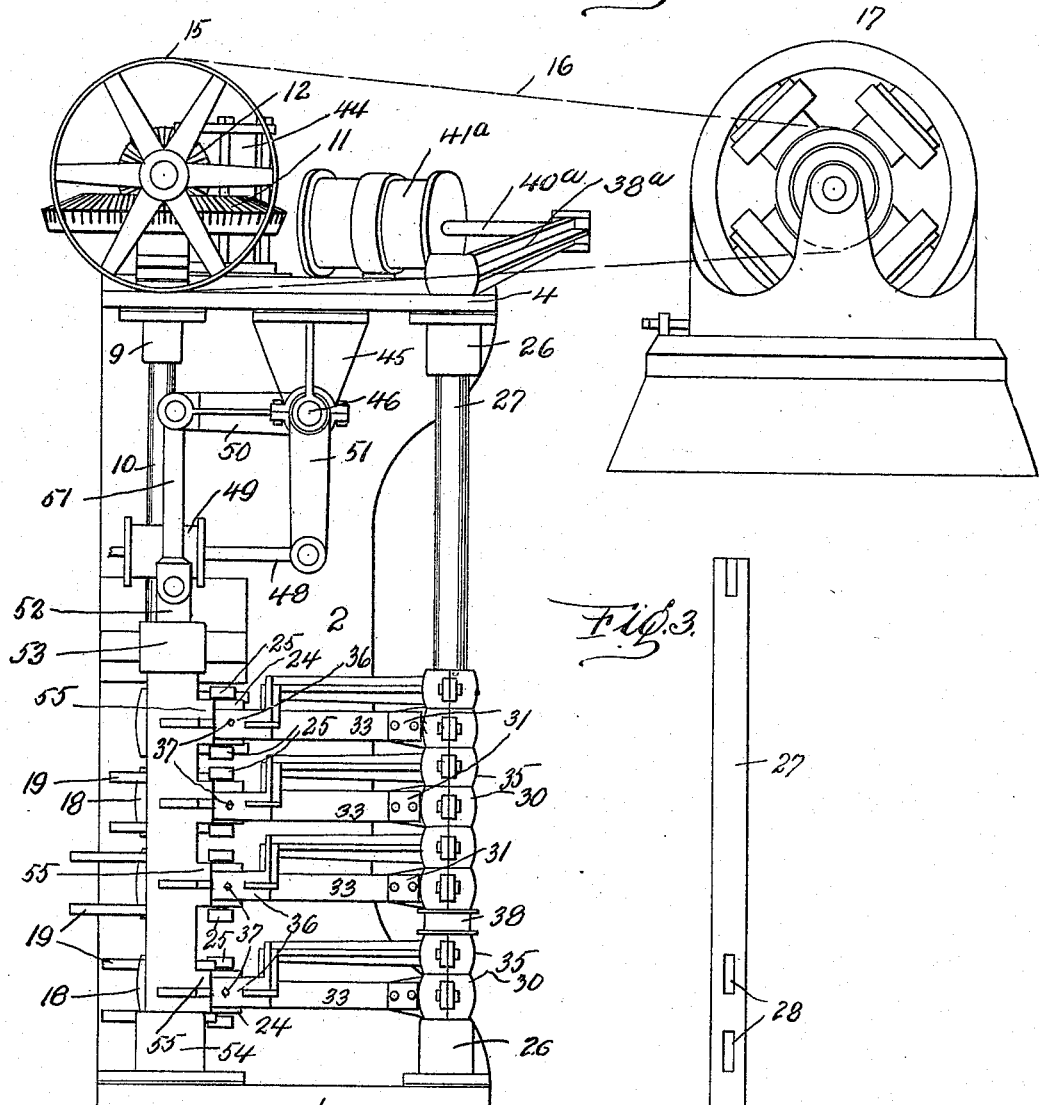
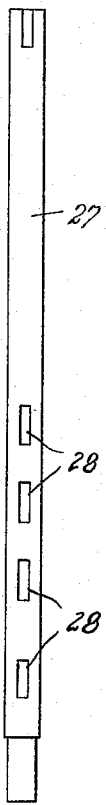
Witnesses
Samuel Payne
O. H. Fuller
Inventors
F. M. Sharp
L. W. Williams
By H. C. Evert
Attorneys

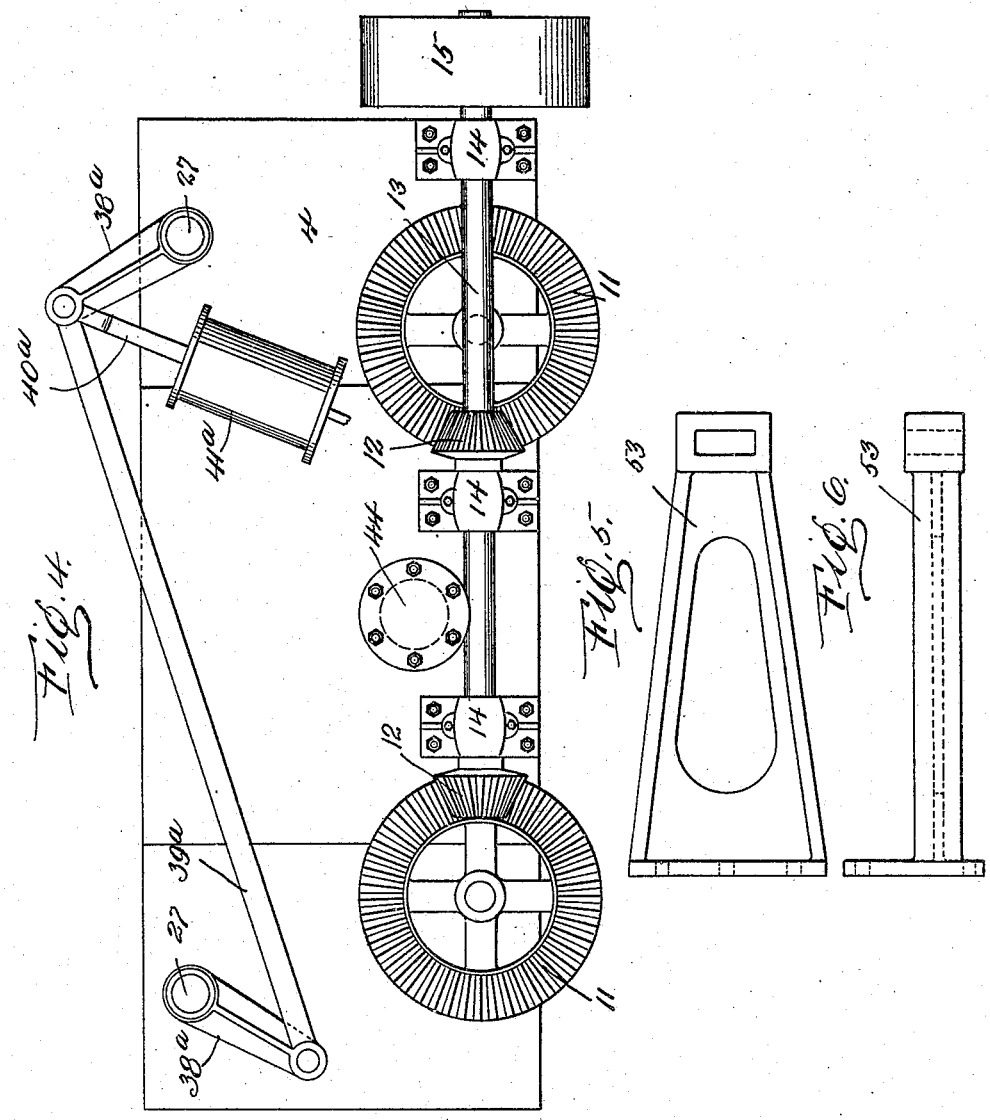

F. M. SHARP & L. W. WILLIAMS.
MACHINE FOR REMOVING CORES FROM CASTINGS.
APPLICATION FILED NOV. 21, 1908.
930,892.
Patented Aug. 10, 1909.
5 SHEETS—SHEET 4.
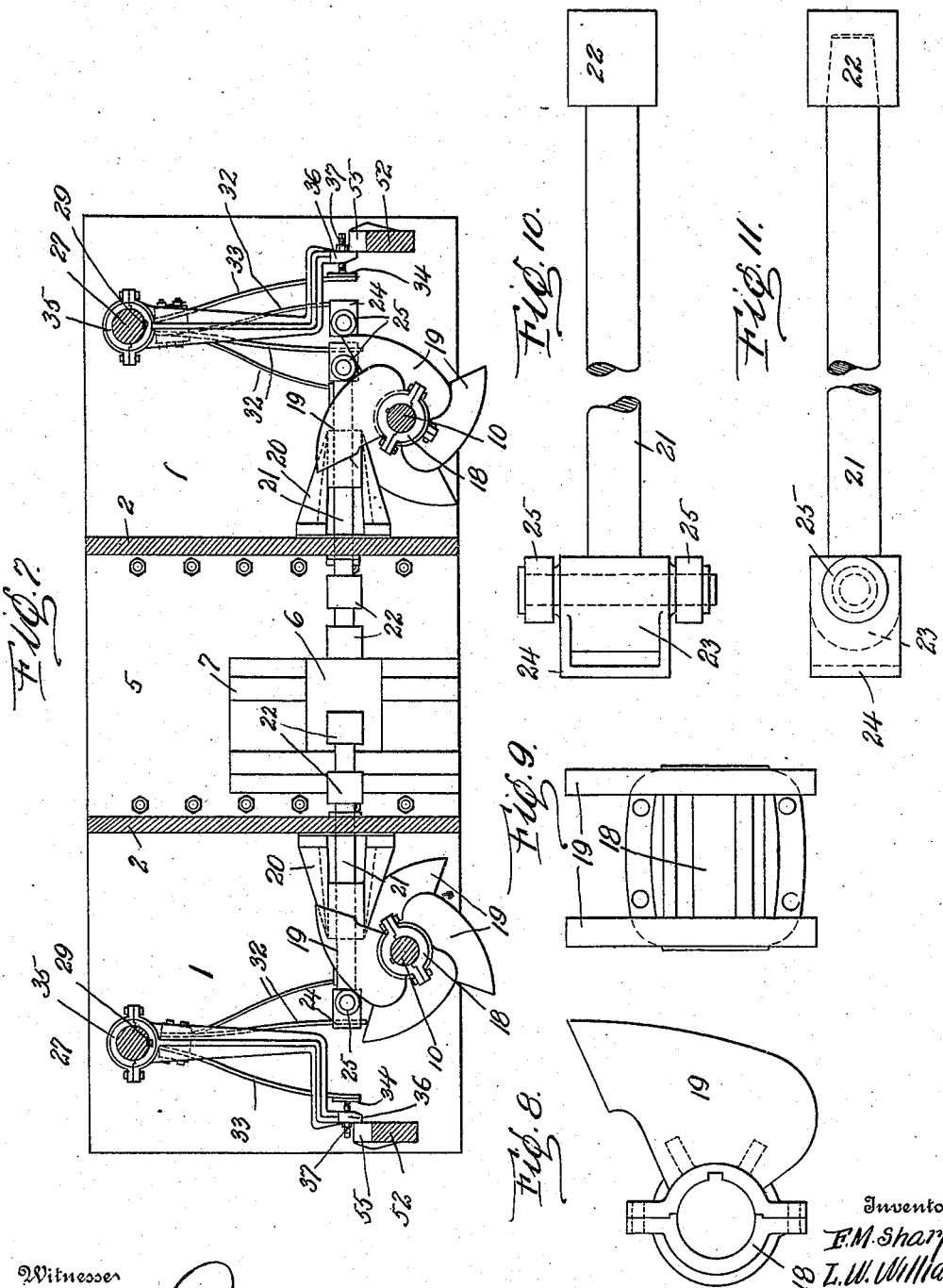

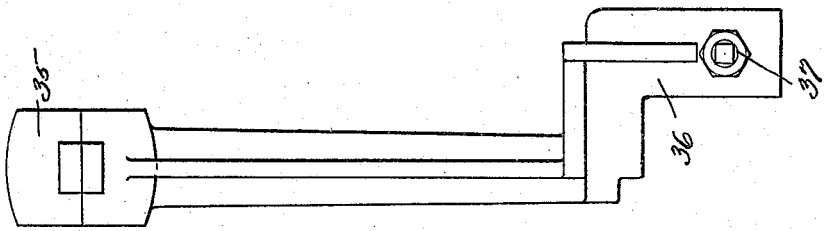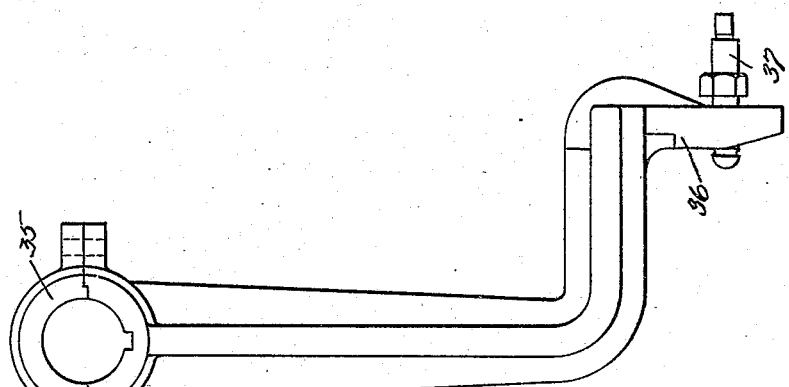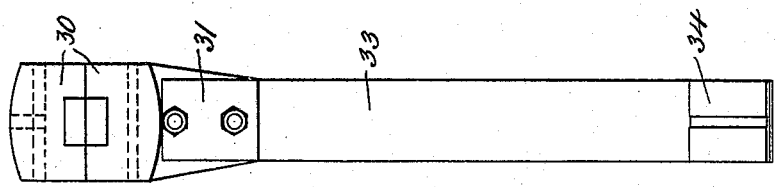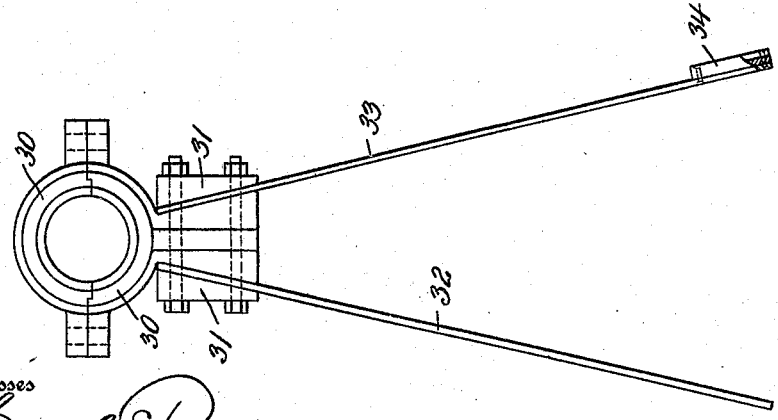

UNITED STATES PATENT OFFICE.

FREDERICK M. SHARP AND LELAND W. WILLIAMS, OF SHARON, PENNSYLVANIA.

MACHINE FOR REMOVING CORES FROM CASTINGS.

No. 930,892.　　　Specification of Letters Patent.　　　Patented Aug. 10, 1909.

Application filed November 21, 1908. Serial No. 463,885.

*To all whom it may concern:*

Be it known that we, FREDERICK M. SHARP and LELAND W. WILLIAMS, citizens of the United States of America, residing at Sharon, in the county of Mercer and State of Pennsylvania, have invented certain new and useful Improvements in Machines for Removing Cores from Castings, of which the following is a specification, reference being had therein to the accompanying drawing.

This invention relates to machines for removing cores from castings, and the object of our invention is, to provide a novel machine in which a casting can be placed and automatically agitated to loosen the sand core therein and thoroughly remove all particles that might adhere to the casting.

Our improved machine is particularly designed for foundries and such places where a large number and variety of castings are produced, especially castings having concavities formed therein, where it is almost impossible to manually reach the sand and remove the same.

To this end we have devised a machine for pounding or vibrating a casting to eject all sand contained therein, the ejection of the sand or core being easily and quickly accomplished in an economical manner, both regarding time and labor.

With the above and other objects in view which will more readily appear as the invention is better understood, the same consists in the novel construction, combination and arrangement of parts to be presently described and then pointed out in the appended claims.

In the drawings:—Figure 1 is a front elevation of our machine partly broken away and partly in section, Fig. 2 is a side elevation of the same, Fig. 3 is an elevation of an adjusting shaft, Fig. 4 is a plan of our machine, Fig. 5 is a plan of a guide bracket, Fig. 6 is an elevation of the same, Fig. 7 is a horizontal sectional view of our machine, taken on the line x—x of Fig. 1, Fig. 8 is an enlarged plan of a cam, Fig. 9 is an elevation of the same, Fig. 10 is an elevation of an agitator partly broken away, Fig. 11 is a plan of the same, Fig. 12 is a plan of a spring holding bracket, partly broken away and partly in section, Fig. 13 is an elevation of the same, Fig. 14 is a plan of a spring adjusting arm, and Fig. 15 is an elevation of the same.

To put our invention into practice, we provide two L-frames comprising base plates 1 and uprights 2, said uprights fitting in sockets 3 provided therefor in a top plate 4. The base plates 1 of the L-frames are connected together by a plate 5, which is provided with an opening 6 and a bearing block 7, the object of which willl presently appear. The plates 1 and 4 at the front edges thereof are provided with bearings 8 and 9 for vertical revoluble shafts 10, the upper end of each shaft having a fixed horizontal beveled gear wheel 11. Meshing with said beveled gear wheels 11 are small beveled gear wheels 12 mounted upon a shaft 13, journaled in bearings 14 provided therefor upon the top plate 4. The shaft 13 is provided with a belt wheel 15 adapted to be driven by a belt 16 from a motor 17 located convenient to the machine.

Upon each shaft 10 is mounted a plurality of cams, each cam comprising a two-part sleeve 18 bolted and suitably secured upon the shaft 10, as illustrated in Figs. 1 and 7 of the drawings. Each sleeve is provided with two blades or cams 19, and the sleeves 18 of one shaft are disposed whereby the cams thereof will be staggered with relation to the cams of the other of the said shafts 10, the object of which will presently appear.

The outer faces of the uprights 2 are provided with vertically arranged bearings 20 for agitators or hammers, each agitator or hammer comprising a rod 21 having a beater head 22 and a bearing head 23, the latter being formed with a stirrup 24, and provided with roller bearings 25 adapted to be engaged by the cams 19 of the shafts 10.

The base plate 1 and the top plate 4 are provided with bearings 26, for adjusting shafts 27. These shafts are provided with spring holding brackets and spring adjusting arms alternately arranged as best shown in Fig. 2. The spring holding brackets are loosely mounted upon the shafts, while the spring adjusting arms are mounted for rotation with the shaft by keys 29 engaging in keyways 28 provided therefor in said shafts. The spring holding brackets comprise two-part sleeves 30 and blocks 31, said blocks holding springs 32 and 33 in engagement with the bracket, and springs 33 have their free ends provided with bearing plates 34, the object of which will presently appear. The spring adjusting arms comprise two-part sleeves 35 mounted upon the shafts 27 to rotate therewith. These arms are provided with angular reinforced depending ends 36 for adjustable screws 37. The screws 37 are adapted to engage the bearing plates of the springs 33 and increase the tension upon the springs 32, which are adapted to engage in the stirrups 24 of the agitators.

Upon the shafts 27 are located spacer sleeves 38, the object of which will presently appear. The upper ends of the shafts 27 are provided with crank arms 38ª connected by a link 39ª to the piston rod 40ª of the cylinder 41ª, said cylinder being operated by air or steam.

The casting 39 to be agitated by the beater heads 22 is located in the bearing block 7 and is supported by a cross head 40 guided by ribs 41 carried by the confronting face of the uprights 2. The cross head 40 is connected by chains 42 to the piston rod 43, which extends into a vertical cylinder 44 located upon the top plate 4 and operated by air or steam.

The top plate 4 is provided with depending bearings 45 for a shaft 46, having a crank arm 47 connecting with a piston 48, which extends into a cylinder 49 and is moved through the medium of air or steam entering said cylinder. The ends of the shaft 46 are provided with crank arms 50 connected by links 51 to plates 52, which are slidably mounted in guide brackets 53 carried by the outer face of the uprights 2; the base plate 1 being provided with sockets 54 for the lower ends of said plates. These plates are provided with extensions 55 for engaging the reinforced angular depending ends 36 of the spring adjusting arms.

Operation: In Fig. 1 of the drawings, we have illustrated the casting 39 as representing a car coupler head, this casting being properly positioned, whereby when sand is discharged from the same, the sand passes through the opening 6. Assuming that the driven shaft 13 is rotating, a similar movement will be imparted to the shafts 10 by virtue of the beveled gear wheels 11 and 12. As the shafts 10 rotate, the blades or cams 19 contacting with the rollers 25 of the agitators cause said agitators to be moved outwardly, and when the cams 19 release the agitators, the springs 32 and 33 are adapted to force the agitators inwardly and cause the beater heads to strike the casting 39. These beater heads cause the casting to vibrate and loosen the sand or core therein. The arrangement of the cams 19 prevents the agitators from operating in unison, in consequence of which the casting 39 will be subjected to a hammering that will remove all particles of the core therefrom. When the machine is not in operation, the tension upon the springs 32 and 33 is released by swinging the spring adjusting arms outwardly, this being accomplished by placing the cylinder 41ª in operation to move the piston rod 40ª, and crank arms 38ª in the shafts 27. As shown in Fig. 7 of the drawings, the arms are in position to maintain the springs 32 and 33 under tension, and to lock the arms in this position the cylinder 49 is placed in operation to rock the shaft 46 and raise the plates 52, whereby the extensions 55 of said plates will engage behind the arms at one side of the adjustable screws 37 of the spring adjusting arms and prevent said arms from swinging outwardly. The stroke of the agitators is regulated through the medium of the adjusting screws 37 and the shape of the cams 19.

The roller bearings 25 are adapted to reduce the friction upon the cams 19 and insure an easy operation of the machine.

The spacer sleeves 38 are used upon the shafts 27 and a greater space is allowed between the two lowermost agitators than the other agitators, due to the shape of the casting 39, the machine illustrated being designed for removing cores from coupler heads.

The shape of the beater heads 22 can be changed, whereby the agitators can impinge a curved surface upon the casting as well as a flat surface.

It is thought that our invention will be fully understood from the foregoing description, and we reserve the right to use suitable mechanism for controlling the operation of the cylinders 41ª, 44 and 49, also to make any alterations in the construction of our machine as are permissible by the appended claims.

Having now described our invention what we claim as new, is:—

1. A machine of the type described embodying L-frames, a top plate connecting said frames, a driven shaft journaled upon said top plate, vertical shafts arranged between said L-frames and said top plate and adapted to be rotated by said driven shaft, bearings carried by the outer sides of said frames, agitators movably mounted in said bearings, beater heads carried by the inner ends of said agitators, roller bearings carried by the outer ends of said agitators, a plurality of staggeredly arranged cams mounted upon said vertical shafts and adapted to engage said roller bearings, adjusting shafts arranged between said frames and said top plate, spring holding brackets loosely mounted upon said adjusting shafts, springs carried by said brackets, some of said springs engaging said agitators, spring adjusting arms fixed upon said adjusting shafts and engaging the other of said springs, movable plates arranged upon said frames for holding said spring adjusting arms in a fixed position, a movable cross head arranged between said frames for positioning a casting, means arranged upon said top plate for moving said adjusting shafts, and means arranged beneath said top plate for moving said plates to free said spring adjusting arms.

2. A machine of the type described comprising L-frames, a top plate connecting said frames, a driven shaft journaled upon said top plate, vertical shafts arranged between said frames and said top plate and adapted to be rotated by said driven shaft, agitators movably mounted in said frames, cams staggeredly arranged upon said vertical shafts for moving said agitators, adjusting shafts arranged between said frames and said top plate, spring holding brackets loosely mounted upon said shafts, spring adjusting arms fixed upon said shafts between said brackets, springs carried by said brackets for engaging said agitators and said arms, plates movably mounted upon said frames for holding said arms in a fixed position, a movable cross head arranged between said frames for holding a casting, means arranged upon said top plate for moving said adjustable shafts, means arranged upon said top plate for moving said cross head, and means arranged beneath said top plate for moving said plates and releasing said arms.

3. A machine of the type described comprising L-frames, a top plate connecting said frames, a driven shaft journaled upon said top plate, vertical shafts arranged between said frames and said top plate and adapted to be rotated by said driven shaft, agitators movably mounted in said frames, cams staggeredly arranged upon said vertical shafts for moving said agitators, adjusting shafts arranged between said frames and said top plate, spring holding brackets loosely mounted upon said shafts, spring adjusting arms fixed upon said shafts between said brackets, springs carried by said brackets for engaging said agitators and said arms, plates movably mounted upon said frames for holding said arms in a fixed position, a movable cross head arranged between said frames for holding a casting.

4. A machine of the type described comprising frames, a top plate connecting said frames, vertical shafts arranged between said frames and said top plate, agitators movably mounted in said frames, cams staggeredly arranged upon said vertical shafts for moving said agitators, adjusting shafts arranged adjacent to said vertical shafts, spring holding brackets loosely mounted upon said adjusting shafts, spring adjusting arms fixed upon said shafts, springs carried by said brackets for engaging said agitators and said arms, plates movably mounted upon said frames for holding said arms in a fixed position, a movable cross head arranged between said frames for holding a casting, means arranged upon said top plate for moving said adjustable shafts, and means arranged beneath said top plate for moving said plates and releasing said arms.

5. A machine of the type described comprising frames, a top plate connecting said frames, vertical shafts arranged between said frames and said top plate, agitators movably mounted in said frames, cams staggeredly arranged upon said vertical shafts for moving said agitators, adjusting shafts arranged adjacent to said vertical shafts, spring holding brackets loosely mounted upon said adjusting shafts, spring adjusting arms fixed upon said shafts, springs carried by said brackets for engaging said agitators and said arms, plates movably mounted upon said frames for holding said arms in a fixed position, a movable cross head arranged between said frames for holding a casting, and means arranged upon said top plate for moving said adjustable shafts.

6. A machine of the type described comprising frames, a top plate connecting said frames, vertical shafts arranged between said frames and said top plate, agitators movably mounted in said frames, cams staggeredly arranged upon said vertical shafts for moving said agitators, adjusting shafts arranged adjacent to said vertical shafts, spring holding brackets loosely mounted upon said adjusting shafts, spring adjusting arms fixed upon said shafts, springs carried by said brackets for engaging said agitators and said arms, plates movably mounted upon said frames for holding said arms in a fixed position, and a movable cross head arranged between said frames for holding a casting.

7. A machine of the type described comprising frames, a plate connecting said frames, vertical driven shafts arranged upon said frames, cams staggeredly arranged upon said shafts, a plurality of agitators movably mounted in said frames and adapted to be alternately moved by said cams, a movable cross head arranged between said frames for supporting a casting, adjusting shafts arranged adjacent to said vertical shafts, spring holding brackets loosely mounted upon said adjusting shafts, spring adjusting arms fixed upon said shafts, springs carried by said brackets for engaging said agitator and said arms, and means for regulating the tension of said springs.

8. A machine of the type described comprising frames, casting supporting means arranged between said frames, a plurality of agitators movably mounted in said frames for alternately engaging a casting placed therebetween, vertical shafts journaled upon said frames, a plurality of staggeredly arranged cams carried by each shaft for engaging said agitators, and means for normally holding said agitators in engagement with the casting placed between said frames.

9. In a core removing machine, the combination with frames between which is adapted to be supported a casting, of a plurality of spring pressed agitators movably mounted in said frames for alternately engaging said casting, vertical shafts, and means carried by said shafts for alternately moving said agitators and releasing the same to impinge said casting.

10. Means for removing cores from castings comprising a plurality of spring actuated and alternately operated agitators adapted to engage with a casting for oscillating it to remove a core.

11. A machine for removing cores from castings comprising a plurality of alternately operated and spring actuated casting agitators adapted to engage with both sides of a casting for oscillating it to remove a core.

12. A machine for removing cores from castings comprising a casting support, and two series of super-imposed agitators adapted to engage with a casting for shifting it to remove a core.

13. A machine for removing cores from castings comprising a casting support, two sets of spring actuated agitators arranged in operative relation with respect to a casting upon the support and adapted to engage the casting to shift it to remove the core, and means whereby the agitators of each set are alternately operated with respect to each other.

14. A machine for removing cores from castings comprising a casting support, a plurality of agitators adapted to alternately engage a casting for shifting it to remove the core therefrom, resilient means for operating said agitators in one direction, and blades for operating said agitators in the opposite direction.

15. A machine for removing cores from castings comprising a plurality of agitators for a casting, resilient means engaging in one end of said agitators for operating the agitators in one direction, and blades engaging one end of the agitators for operating them in the opposite direction.

16. A machine for removing cores from castings comprising a plurality of agitators adapted to engage with a casting for shifting it to remove the core therefrom, rollers and a yoke upon one end of each of the agitators, means engaging with the yokes for shifting the agitators in one direction, and means engaging with the rollers for shifting the agitators in the opposite direction.

17. A machine for removing cores from castings comprising a plurality of agitators operated in alternate directions with respect to each other and adapted to engage a casting for shifting it to remove the core therefrom, resilient means engaging with the agitators for operating them toward the casting, and blades engaging with the agitators for shifting them from the casting.

18. A machine for removing cores from castings comprising a plurality of agitators operated in alternate directions with respect to each other and adapted to engage a casting for shifting it to remove the core therefrom, resilient means engaging with one end of the agitators for shifting them toward the casting, and blades engaging with the said end of the agitators for shifting them from the casting.

In testimony whereof we affix our signatures in the presence of two witnesses.

FREDERICK M. SHARP.
LELAND W. WILLIAMS.

Witnesses:
IRA V. KEPNER,
EDGAR MOSES.